United States Patent [19]

Ogawa

[11] Patent Number: 5,349,417
[45] Date of Patent: Sep. 20, 1994

[54] CAMERA

[75] Inventor: Hidehiro Ogawa, Tokyo, Japan

[73] Assignee: Nikon Corporation, Funabashi, Japan

[21] Appl. No.: 782,313

[22] Filed: Oct. 24, 1991

[30] Foreign Application Priority Data

Oct. 29, 1990 [JP] Japan .................. 2-112086[U]

[51] Int. Cl.5 ................................. G03B 7/00
[52] U.S. Cl. ......................... 354/485; 354/266
[58] Field of Search ............ 354/412, 484, 485, 266

[56] References Cited

U.S. PATENT DOCUMENTS

| | | | |
|---|---|---|---|
| 4,396,266 | 8/1983 | Goto | 354/266 |
| 4,441,801 | 4/1984 | Mashimo et al. | 354/266 |
| 4,477,164 | 10/1984 | Nakai et al. | 354/412 |
| 5,049,917 | 9/1991 | Yasukawa et al. | 354/484 |

Primary Examiner—Russell E. Adams
Attorney, Agent, or Firm—Shapiro and Shapiro

[57] ABSTRACT

A camera equipped with terminals serving as camera activating means, shutter releasing means, communication means and power supply means, all provided in an integral connector housing.

2 Claims, 2 Drawing Sheets

CAMERA

BACKGROUND OF THE INVENTION

1. Field of the Invention

The present invention relates to a camera equipped with a connector which can accommodate accessories having different electrical connection requirements.

2. Related Background Art

Conventionally, the connectors for connecting a camera and accessories are respectively specified for shutter releasing, data communication etc., and are provided in different positions of the camera body.

Because of such independent positioning of different connectors on the camera body, it has been impossible, in the conventional camera, to achieve space saving or cost reduction.

SUMMARY OF THE INVENTION

In consideration of the foregoing, an object of the present invention is to provide a camera in which the connectors for accessory connection can be unified.

The above-mentioned object can be attained, according to the present invention, by a camera equipped, with a connector housing, having terminals for camera start means, shutter release means, data communication means and power supply means.

According to the present invention, various accessories such as an electrical cable release or a remote control unit can be connected to a single connector, as it includes terminals serving as camera start means, shutter release means, communication means and power supply means.

DESCRIPTION OF THE PREFERRED EMBODIMENTS

Figure 1:
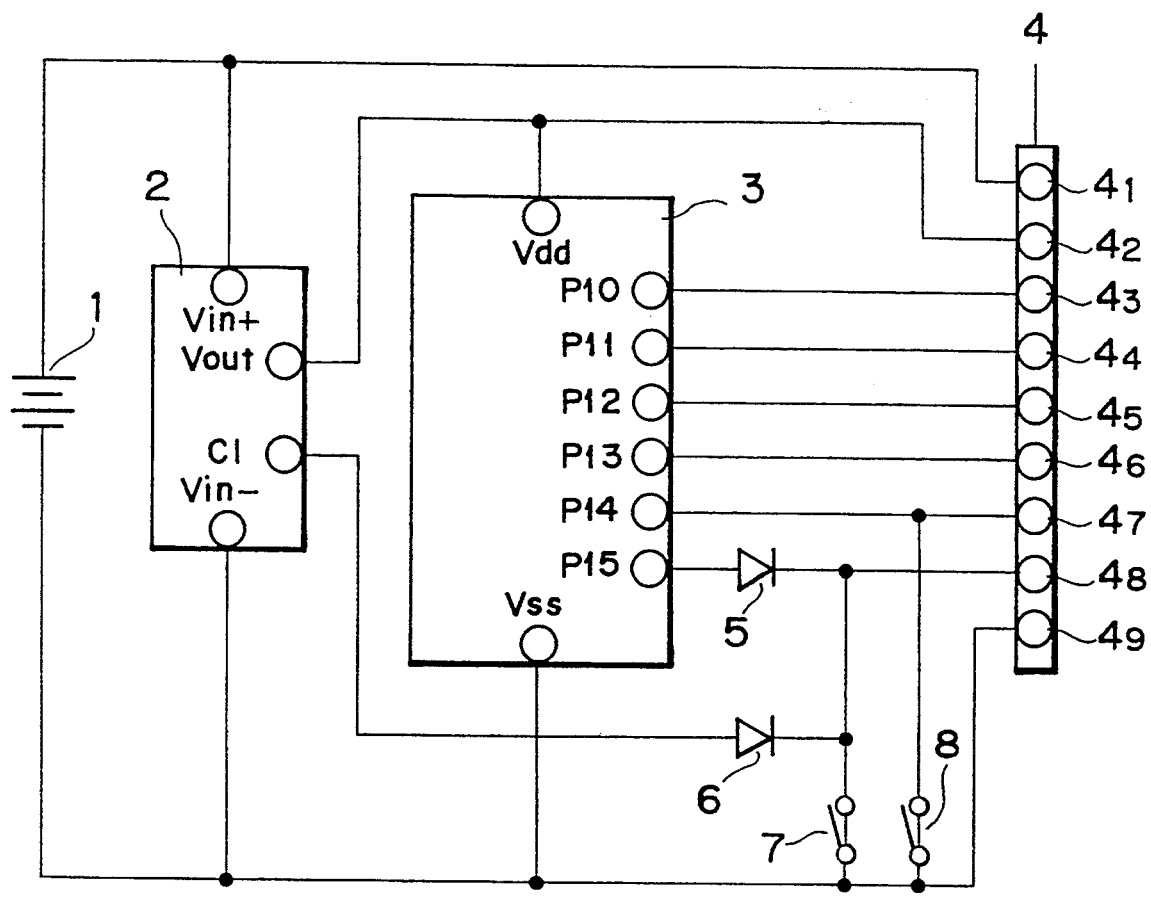
FIG. 1 is a circuit diagram of a camera constituting an embodiment of the present invention.

FIG. 1 is a circuit diagram of a camera constituting an embodiment of the present invention, wherein shown are a battery 1, a DC-DC converter 2 for stabilizing the voltage of the battery 1, a microcomputer 3 for camera control, a connector housing 4, diodes 5, 6, and switches 7, 8.

The DC-DC converter 2 is provided with a power input terminal Vin+, another power input terminal Vin−, an output terminal Vout for supplying circuits in the camera with a stabilized voltage, and a control terminal CI for on/off controlling the output terminal Vout. The converter is activated when the control terminal CI is grounded, and it outputs a stable voltage from the output terminal Vout.

The microcomputer 3 is provided with power supply ports Vdd, Vss and input/output ports P10–P15, consisting of a serial communication output port P10, a serial communication input port P11, auxiliary communication ports P12, P13 for regulating the timing of communication, a shutter release signal input port P14, and a camera start signal input port P15. The switches 7, 8 are linked with a shutter release button of the camera body and are respectively closed by the depression of said shutter release button over a first stroke and a second stroke. When the switch 7 is closed, the control terminal CI of the DC-DC converter 2 is grounded through the diode 6 to activate the DC-DC converter 2, whereby a voltage is supplied from the output terminal Vout thereof to the microcomputer 3 and other unrepresented circuits and the camera is thus activated. Simultaneously the state of the switch 7 is entered through the diode 5 to the port P15 of the microcomputer 3, whereby the function of the camera is started. The function of the DC-DC converter 2 is continued for a predetermined period, by an unrepresented power supply holding circuit. When the shutter release button is depressed over the second stroke, the switch 8 is closed and this state is entered into the port P14 of the microcomputer 3. The camera executes a shutter releasing operation in response to the grounding of the port P14.

The connector housing 4 is provided in a predetermined position of the camera body, for example a lower or lateral position in the front face thereof, and is connectable with the connector of an external accessory as will be explained later.

The connector housing 4 is provided therein with a power supply terminal $4_1$ receiving the battery voltage; a $V_{cc}$ terminal $4_2$ receiving the output of the DC-DC converter 2; a serial output terminal $4_3$, a serial input terminal $4_4$, an I/O-1 terminal $4_5$, an I/0-2 terminal $4_6$, a shutter release terminal $4_7$ and a start terminal $4_8$ respectively connected to the ports P10 –P15 of the microcomputer 3; and a ground terminal $4_9$. Said start terminal $4_8$ is connected to the cathodes of the diodes 5, 6 and to the switch 7. The grounding of said start terminal $4_8$ creates a same state as the first stroke depression of the shutter release button, thereby activating the camera. Also the grounding of the shutter release terminal $4_7$, connected to the port P14 of the microcomputer 3 and the switch 8, creates a same state as the second stroke depression of the shutter release button, thereby releasing the shutter of the camera. The serial output terminal $4_3$ and the serial input terminal $4_4$ are respectively connected to the ports P10, P11 of the microcomputer 3 and can be used for serial communication. The I/O-1 terminal $4_5$ and the I/O-2 terminal $4_6$ are respectively connected to the ports P12, P13 of the microcomputer 3, and are used, for example, for the timing control in said serial communication.

Figure 2:
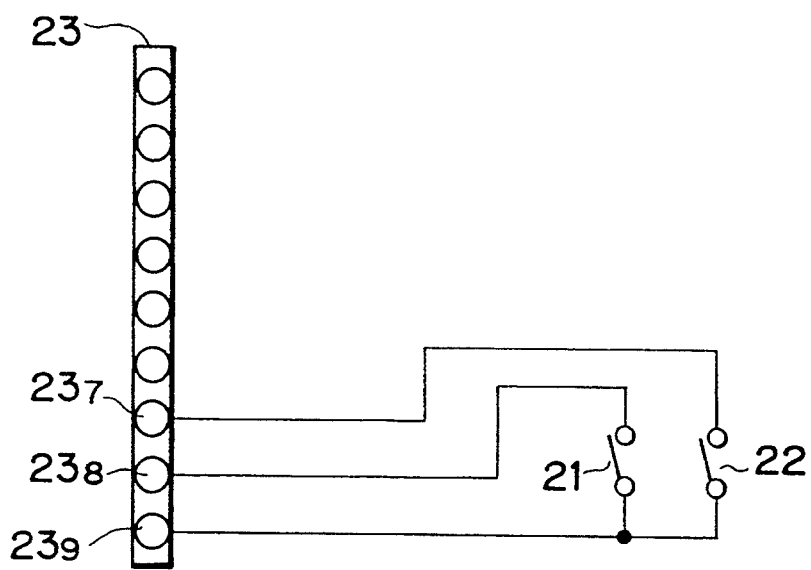
FIG. 2 is a circuit diagram of an embodiment of an accessory to be connected to the connector shown in FIG. 1.

FIG. 2 is a circuit diagram of a remote control device as an accessory to be connected to the connector 4 shown in FIG. 1, for activating the camera and causing the shutter releasing operation therein. There are provided switches 21, 22 and a connector 23 to be connected to the connector 4 shown in FIG. 1. The switch 21 is connected to a start terminal $23_8$ of the connector 23, while the switch 22 is connected to a shutter release terminal $23_7$, and the other ends of said switches 21, 22 are connected to a ground terminal $23_9$ of the connector 23. In said accessory, the closing of the switch 21 activates the camera, and that of the switch 22 causes the shutter releasing operation in the camera.

Figure 3:
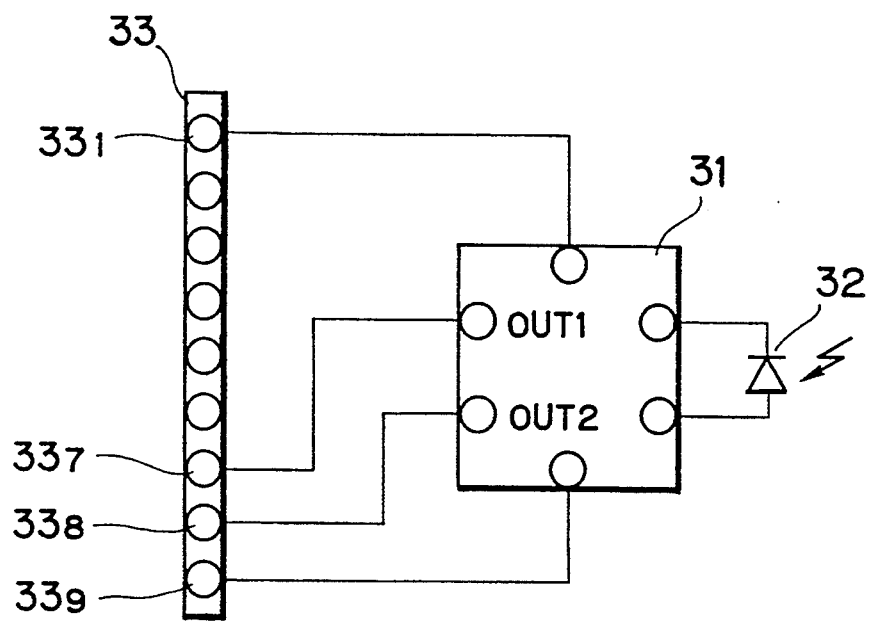
FIG. 3 is a circuit diagram of another embodiment of an accessory to be connected to the connector shown in FIG. 1.

FIG. 3 is a circuit diagram of a receiver unit of a remote control, constituting another accessory to be connected to the connector 4 shown in FIG. 1 and adapted to activate the camera by receiving a light signal from an unrepresented light-emitting unit. A controller 31 including a light-receiving amplifier and a control circuit, amplifies light signals received by a photoreceptor 32 to discriminate a start signal or a shutter releasing signal for the camera. When a start signal is discriminated, an output port OUT2 is shifted to the L-level state to transmit the start signal to the camera, thereby initiating the functions of the camera. Also when the received light signal is discriminated as a shutter release signal, an output port OUT1 is shifted to the L-level state to transmit the shutter release signal to the camera, thereby causing the shutter releasing operation in the camera. A connector 33 includes a power supply terminal $33_1$, a shutter release terminal $33_7$, a start terminal $33_8$, and a ground terminal $33_9$.

Figure 4:
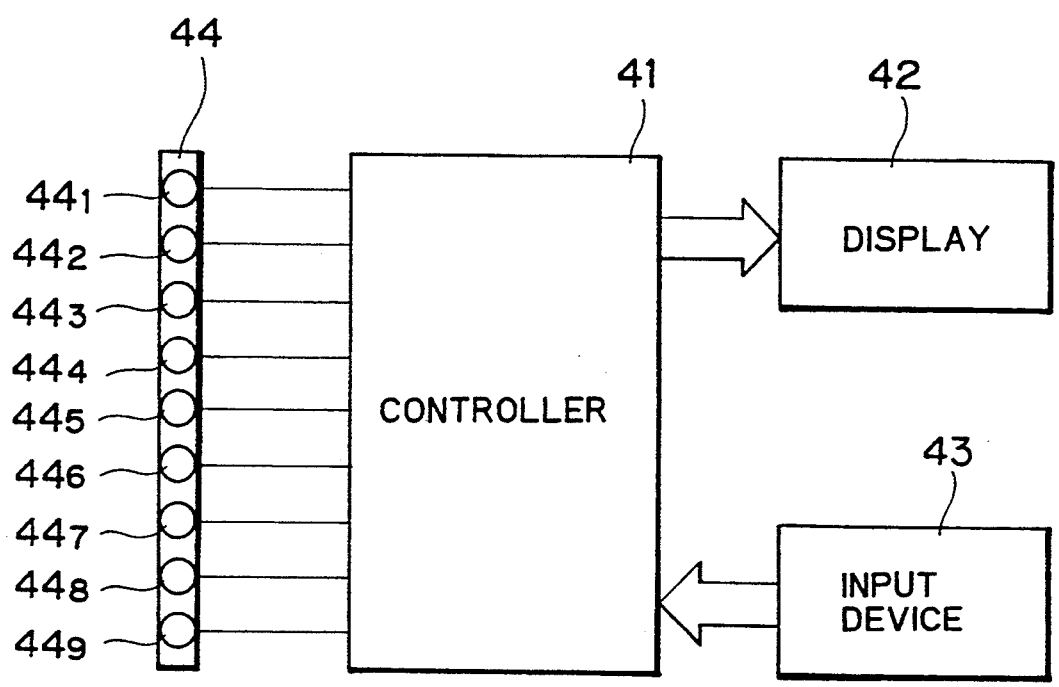
FIG. 4 is a block diagram of a remote control unit constituting still another embodiment of an accessory to be connected to the connector shown in FIG. 1.

FIG. 4 is a block diagram of a remote control unit, constituting still another accessory to be connected to the connector 4 shown in FIG. 1. There are shown a controller 41 composed of a microcomputer, a display unit 42 composed, for example, of a liquid crystal display unit for displaying data in response to signals from the controller 41, and an input unit 43 for sending commands and data by plural switches to the controller 41. The controller 41 is provided with serial communication means, of which terminals are connected to a serial input terminal $44_3$ and a serial output terminal $44_4$ of a connector 44. When a shutter speed, for example, is entered from the input unit 43, the controller 41 recognizes said input and sends data, corresponding to the shutter speed entered from the input unit 43, from the serial output terminal $44_4$ of the connector 44. Said output terminal $44_4$ is connected to the serial input terminal $4_4$ of the connector 4 shown in FIG. 1. In response to said data, the camera varies the shutter speed. Also the camera releases, from the serial output terminal $4_3$ of the connector 4 shown in FIG. 1, a signal indicating proper reception of data or completion of setting of the camera. Said signal is supplied to the serial input terminal $44_3$ shown in FIG. 4, and the controller 41 displays the result on the display unit 42. All terminals of the connector 44 are connected to the controller 41, but these may be used according to the requirements of a particular system. For example an I/O-1 terminal $44_5$ and an I/O-2 terminal $44_6$ are auxiliary terminals for communication, and may be used for regulating the timing of the communication with the camera, or of the signal exchange with the camera other than the communication. A shutter release terminal $44_7$ is used for sending a shutter release command entered from the input unit 43, but is not required if said command is sent through the communication line. Also the start signal, used for activating the camera, is unnecessary when the camera is activated by the first stroke depression of the shutter release button of the camera. A power supply terminal $44_1$ receives the voltage of a battery incorporated in the camera, but is unnecessary if the remote control unit shown in FIG. 4 is equipped with a separate power source. Furthermore, a Vcc terminal $44_2$ is used, for example, in case of absorbing the difference in voltage between the controller 41 of the remote control unit and the camera. There are further provided a start terminal $44_8$, and a ground terminal $44_9$.

According to the present invention, as explained in the foregoing, terminals serving as the camera starting means, shutter releasing means, communication means and power supply means are provided in a same connector housing of a camera, so that various accessories can be connected to said connector and there can be attained advantages of space saving and cost reduction in the camera. Also since said connector is provided with power supply means of the camera, the accessory connected to said connector need not have a power source therein. It is therefore possible to make the accessory compact and to reduce the cost thereof.

What is claimed is:

1. A camera system comprising a camera and a plurality of external accessories selectively attachable to said camera, wherein said camera comprises:
   a terminal for forming a camera activating circuit;
   a terminal for forming a shutter releasing circuit;
   a terminal for forming a power supply circuit;
   a terminal for forming a data communication circuit; and
   a connector fixed on the camera body as an integral unit including all the above-mentioned terminals arranged in a predetermined positional relationship; and
   wherein said accessories are provided with respective connectors connectable with the connector of the camera and having respective groups of terminals corresponding to different groups of the above-mentioned terminals of the camera.

2. A camera system according to claim 1, wherein the connector of one of said external accessories comprises a first terminal connectable with said terminal for forming the camera activating circuit and a second terminal connectable with said terminal for forming the shutter releasing circuit, and said one external accessory comprises a switch connected with said first terminal for controlling the camera activating circuit and a switch connected with said second terminal for controlling the shutter releasing circuit.

* * * * *